US010592373B2

(12) United States Patent
Brown et al.

(10) Patent No.: US 10,592,373 B2
(45) Date of Patent: Mar. 17, 2020

(54) INTEGRATING EXTERNAL SERVICES WITH A CLUSTERED FILE SYSTEM

(71) Applicant: International Business Machines Corporation, Armonk, NY (US)

(72) Inventors: William B. Brown, Austin, TX (US); Poornima Gupte, Pune (IN); Frank Marschollek, Mainz (DE); Lance W. Russell, Rosanky, TX (US); Rainer Wolafka, Mainz (DE); Rong Zeng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/890,228

(22) Filed: Feb. 6, 2018

(65) Prior Publication Data
US 2018/0157570 A1  Jun. 7, 2018

Related U.S. Application Data

(63) Continuation of application No. 14/735,821, filed on Jun. 10, 2015, now Pat. No. 9,940,213.

(51) Int. Cl.
*G06F 11/30* (2006.01)
*G06F 11/14* (2006.01)
(Continued)

(52) U.S. Cl.
CPC .......... *G06F 11/3006* (2013.01); *G06F 3/067* (2013.01); *G06F 11/1415* (2013.01); *G06F 16/183* (2019.01); *H04L 67/1097* (2013.01)

(58) Field of Classification Search
CPC .... G06F 11/3006; G06F 16/183; G06F 3/067; G06F 11/1415; G06F 11/1482; G06F 11/202; G06F 11/2046; H04L 67/1097
See application file for complete search history.

(56) References Cited

U.S. PATENT DOCUMENTS 6,748,429 B1 * 6/2004 Talluri ................. G06F 9/5061
709/221
7,028,225 B2 * 4/2006 Maso .................. G06F 11/3438
702/186

(Continued)

FOREIGN PATENT DOCUMENTS

EP  000798656 A2  10/1997
EP  1578088 A2   9/2005
(Continued)

OTHER PUBLICATIONS

List of IBM Patents or Patent Applications Treated as Related.
(Continued)

*Primary Examiner* — Jimmy H Tran
(74) *Attorney, Agent, or Firm* — Zilka-Kotab, P.C.

(57) ABSTRACT

A computer-implemented method according to one embodiment includes receiving, via an interface of a clustered file system, callback registration information from an external service, identifying a plurality of parameters associated with the callback registration information, constructing a service registration within the clustered file system, based on the plurality of parameters, identifying the service registration in response to an occurrence of one or more events, and performing one or more callbacks, according to the service registration.

17 Claims, 6 Drawing Sheets

(51) Int. Cl.
*G06F 3/06* (2006.01)
*H04L 29/08* (2006.01)
*G06F 16/182* (2019.01)

(56) References Cited

U.S. PATENT DOCUMENTS

| | | | | |
|---|---|---|---|---|
| 7,228,369 | B2* | 6/2007 | Nakamura | G06F 3/061 |
| | | | | 710/38 |
| 7,392,421 | B1* | 6/2008 | Bloomstein | G06F 11/1482 |
| | | | | 714/4.4 |
| 7,403,945 | B2* | 7/2008 | Lin | G06F 17/30362 |
| 7,406,473 | B1* | 7/2008 | Brassow | G06F 17/30067 |
| 7,627,617 | B2* | 12/2009 | Kavuri | G06F 3/0605 |
| 7,779,425 | B2* | 8/2010 | Pudipeddi | G06F 9/4411 |
| | | | | 707/705 |
| 7,783,610 | B2* | 8/2010 | Lin | G06F 17/30362 |
| | | | | 707/689 |
| 7,958,385 | B1* | 6/2011 | Frangioso | G06F 11/2025 |
| | | | | 709/223 |
| 8,266,111 | B2* | 9/2012 | Lin | G06F 17/30362 |
| | | | | 707/674 |
| 8,392,378 | B2* | 3/2013 | Pafumi | G06F 11/1658 |
| | | | | 707/640 |
| 8,417,681 | B1* | 4/2013 | Miloushev | G06F 17/30067 |
| | | | | 707/704 |
| 8,769,100 | B2* | 7/2014 | Yao | H04L 67/1002 |
| | | | | 709/226 |
| 8,892,833 | B2* | 11/2014 | Smith | G06F 11/2733 |
| | | | | 707/634 |
| 8,983,899 | B1* | 3/2015 | Ghait | G06F 17/30212 |
| | | | | 707/604 |
| 9,141,435 | B2* | 9/2015 | Wein | G06F 9/5061 |
| 9,152,666 | B2* | 10/2015 | Lin | G06F 17/30362 |
| 9,390,055 | B2* | 7/2016 | Warfield | G06F 15/17331 |
| 9,626,411 | B1* | 4/2017 | Chang | G06F 17/30463 |
| 9,940,213 | B2 | 4/2018 | Brown et al. | |
| 2002/0103729 | A1* | 8/2002 | Young, III | G06Q 10/06398 |
| | | | | 705/30 |
| 2003/0149735 | A1* | 8/2003 | Stark | H04L 29/06 |
| | | | | 709/208 |
| 2004/0243673 | A1* | 12/2004 | Goyal | G06F 17/30067 |
| | | | | 709/204 |
| 2005/0240943 | A1* | 10/2005 | Smith | G06F 9/465 |
| | | | | 719/328 |
| 2005/0246716 | A1* | 11/2005 | Smith | G06F 9/465 |
| | | | | 719/315 |
| 2006/0004796 | A1* | 1/2006 | Nakamura | G06F 3/061 |
| 2006/0101081 | A1* | 5/2006 | Lin | G06F 17/30362 |
| 2006/0136460 | A1* | 6/2006 | Pudipeddi | G06F 9/4411 |
| 2007/0156789 | A1* | 7/2007 | Semerdzhiev | G06F 17/30176 |
| 2009/0037367 | A1* | 2/2009 | Wein | G06F 9/5061 |
| 2010/0082774 | A1* | 4/2010 | Pitts | G06F 17/30144 |
| | | | | 709/219 |
| 2010/0125844 | A1* | 5/2010 | Mousseau | G06F 9/50 |
| | | | | 718/1 |
| 2011/0238842 | A1* | 9/2011 | Massa | G06F 11/1479 |
| | | | | 709/226 |
| 2011/0289417 | A1* | 11/2011 | Schaefer | G06F 11/1458 |
| | | | | 715/735 |
| 2012/0072596 | A1* | 3/2012 | Kruse | G06F 17/3012 |
| | | | | 709/226 |
| 2012/0150815 | A1* | 6/2012 | Pafumi | G06F 11/1658 |
| | | | | 707/679 |
| 2012/0303686 | A1* | 11/2012 | Ananthanarayanan | G06F 16/1858 |
| | | | | 707/827 |
| 2013/0080559 | A1* | 3/2013 | Rao | H04L 67/1097 |
| | | | | 709/208 |
| 2013/0205063 | A1* | 8/2013 | Zhang | G06F 11/1415 |
| | | | | 711/102 |
| 2013/0290249 | A1* | 10/2013 | Merriman | G06F 17/30578 |
| | | | | 707/610 |
| 2014/0025770 | A1* | 1/2014 | Warfield | G06F 15/17331 |
| | | | | 709/213 |
| 2015/0120928 | A1 | 4/2015 | Gummaraju et al. | |
| 2015/0333992 | A1 | 11/2015 | Vasseur et al. | |
| 2015/0339333 | A1* | 11/2015 | Pudipeddi | G06F 17/30581 |
| | | | | 707/822 |
| 2015/0370502 | A1* | 12/2015 | Aron | G06F 3/0626 |
| | | | | 711/162 |
| 2016/0092463 | A1* | 3/2016 | Vijayan | G06F 17/302 |
| | | | | 707/626 |
| 2016/0323237 | A1* | 11/2016 | Warfield | G06F 15/17331 |
| 2016/0364406 | A1* | 12/2016 | Brown | G06F 17/30203 |
| 2016/0366215 | A1* | 12/2016 | Brown | H04L 67/1095 |
| 2016/0378450 | A1* | 12/2016 | Fu | G06F 8/61 |
| | | | | 717/177 |
| 2017/0026378 | A1* | 1/2017 | Beck | H04L 63/12 |
| 2017/0212686 | A1* | 7/2017 | Moore | H04L 29/06 |

FOREIGN PATENT DOCUMENTS

| | | |
|---|---|---|
| EP | 001918836 A1 | 5/2008 |
| EP | 002780836 A1 | 9/2014 |
| WO | 2008134527 A1 | 11/2008 |

OTHER PUBLICATIONS

Advisory Action from U.S. Appl. No. 14/735,685, dated Jul. 24, 2018.

Pourzandi et al., "Clusters and security: distributed security for distributed systems," In Cluster Computing and the Grid, vol. 1, 2005, pp. 96-104.

Nagle et al., "The panasas activescale storage cluster: Delivering scalable high bandwidth storage," In Proceedings of the 2004 ACM/IEEE conference on Supercomputing, 2004, pp. 1-10.

Flouris et al, "Extensible block-level storage virtualization in cluster-based systems," Journal of Parallel and Distributed Computing, vol. 70, No. 8, 2010, pp. 800-824.

Flouris et al, "Orchestra: Extensible block-level support for resource and data sharing in networked storage systems," ICPADS'08 14th IEEE International Conference, 2008, pp. 237-244.

Brown et al., U.S. Appl. No. 14/735,821, filed Jun. 10, 2015.

Brown et al., U.S. Appl. No. 14/735,685, filed Jun. 10, 2015.

Non-Final Office Action from U.S. Appl. No. 14/735,821, dated Jun. 22, 2017.

Non-Final Office Action from U.S. Appl. No. 14/735,685, dated Oct. 2, 2017.

Notice of Allowance from U.S. Appl. No. 14/735,821, dated Dec. 5, 2017.

Final Office Action from U.S. Appl. No. 14/735,685, dated May 17, 2018.

Non-Final Office Action from U.S. Appl. No. 14/735,685, dated Nov. 2, 2018.

Final Office Action from U.S. Appl. No. 14/735,685, dated May 14, 2019.

Non-Final Office Action from U.S. Appl. No. 14/735,685, dated Sep. 9, 2019.

Chavis et al., "A Guide to the IBM Clustered Network File System," IBM Redpaper, Nov. 2010, 82 pages.

* cited by examiner

INTEGRATING EXTERNAL SERVICES WITH A CLUSTERED FILE SYSTEM

BACKGROUND

The present invention relates to clustered file systems, and, more particularly, this invention relates to the integration of external services into a clustered file system.

Clustered file systems provide a powerful homogenous view and access to diverse sources of storage. However, a major drawback to these systems is that the easiest and most direct method for a user to access the file system data is from a node that is a direct member of the file system cluster. To relax this constraint, services have been implemented on top of clustered file systems that export or externalize the clustered file system data. Examples of such services include Network File System (NFS), Server Message Block (SMB), and OpenStack, each of which may export the clustered file system. Users may then access the data from any computer system implementing these ubiquitous protocols.

For reasons associated with availability and performance, it may be desirable for these external services to run simultaneously on all nodes of the clustered file system. Further, these external services, in large part, may be implemented independent of the clustered file system. Consequently, the external services may have their own view of the cluster. This view may include which nodes are up, which nodes are down, and a state of the clustered file system. In some circumstances, an external service's view of the cluster may not be consistent with reality.

Additionally, in order to bring a cluster node up, an administrator may need to initiate multiple software layers. For example, the administrator may need to initiate the clustered file system, and each external service. Still yet, to bring the cluster node down, the administrator may also need to manipulate multiple software layers. This is a cumbersome process, and may result in problems on the cluster.

BRIEF SUMMARY

A computer-implemented method according to one embodiment includes receiving, via an interface of a clustered file system, callback registration information from an external service, identifying a plurality of parameters associated with the callback registration information, constructing a service registration within the clustered file system, based on the plurality of parameters, identifying the service registration in response to an occurrence of one or more events, and performing one or more callbacks, according to the service registration.

According to another embodiment, a computer program product for extending a clustered file system comprises a computer readable storage medium having program instructions embodied therewith, where the computer readable storage medium is not a transitory signal per se, and where the program instructions are executable by a processor to cause the processor to perform a method comprising receiving, utilizing the processor via an interface of a clustered file system, callback registration information from an external service, identifying, utilizing the processor, a plurality of parameters associated with the callback registration information, constructing, utilizing the processor, a service registration within the clustered file system, based on the plurality of parameters, identifying, utilizing the processor, the service registration in response to an occurrence of one or more events, and performing, utilizing the processor, one or more callbacks, according to the service registration.

A system according to another embodiment includes a processor, and logic integrated with the processor, executable by the processor, or integrated with and executable by the processor, where the logic is configured to receive, via an interface of a clustered file system, callback registration information from an external service, identify a plurality of parameters associated with the callback registration information, construct a service registration within the clustered file system, based on the plurality of parameters, identify the service registration in response to an occurrence of one or more events, and perform one or more callbacks, according to the service registration.

Other aspects and embodiments of the present invention will become apparent from the following detailed description, which, when taken in conjunction with the drawings, illustrate by way of example the principles of the invention.

DETAILED DESCRIPTION

Figure 1:
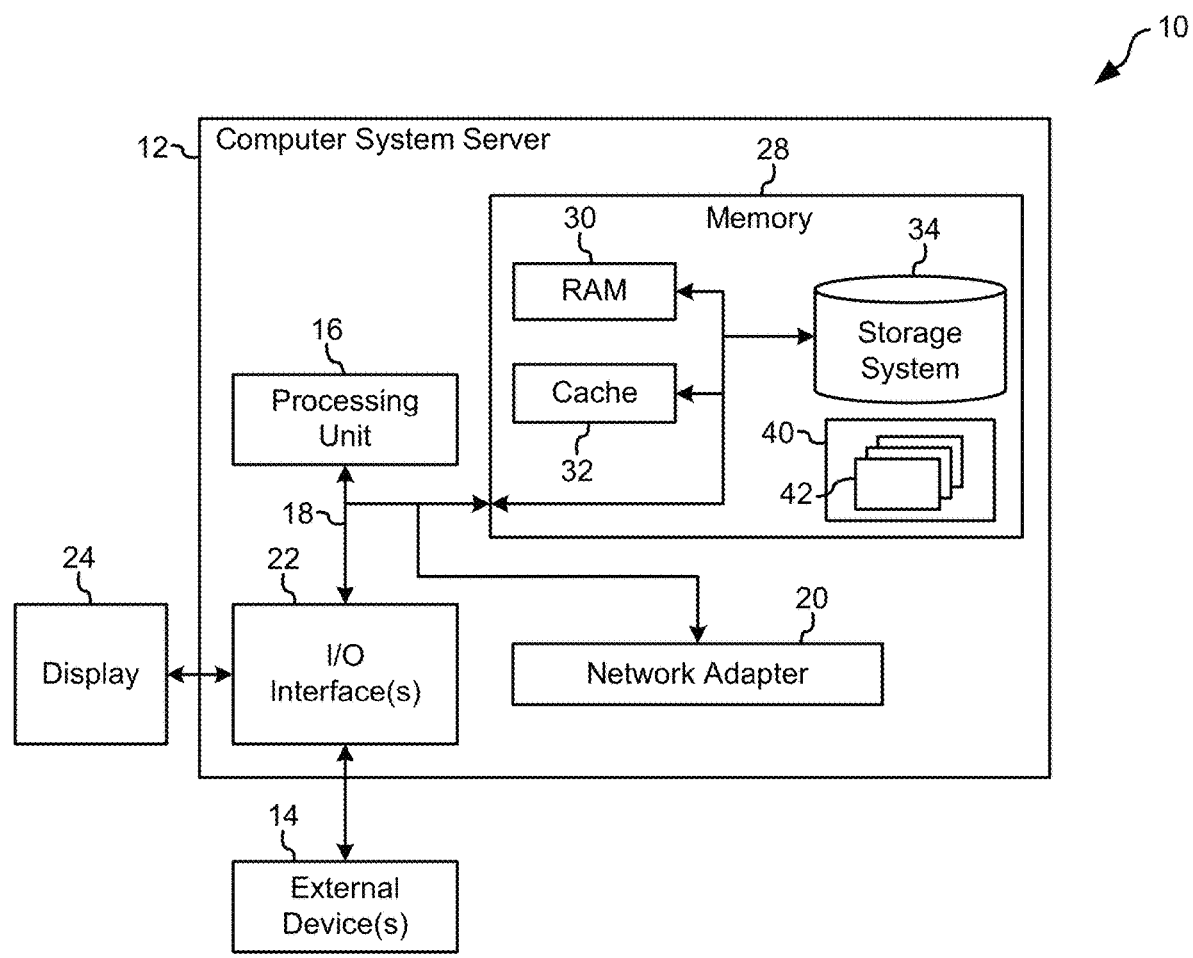
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments for integrating external services with a clustered file system.

In one general embodiment, a computer program product is provided for extending a clustered file system. The computer program product comprises a computer readable storage medium having program instructions embodied therewith. The program instructions are executable by a processor to cause the processor to define functions required by external services implemented on top of a clustered file system, identify at least one function that is not provided by the clustered file system, and extend the clustered file system to provide the at least one function.

In another general embodiment, a computer program product is provided for providing a callback to an external service. The computer program product comprises a computer readable storage medium having program instructions embodied therewith. The program instructions are executable by a processor to cause the processor to define a transition phase in a clustered file system, identify an occurrence of the transition phase, and in response to identifying the occurrence of the transition phase, provide a callback to an external service.

In another general embodiment, a system comprises a processor and logic integrated with and/or executable by the processor. The logic is configured to define a transition phase in a clustered file system, identify an occurrence of the transition phase, and in response to identifying the occurrence of the transition phase, provide a callback to an external service.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
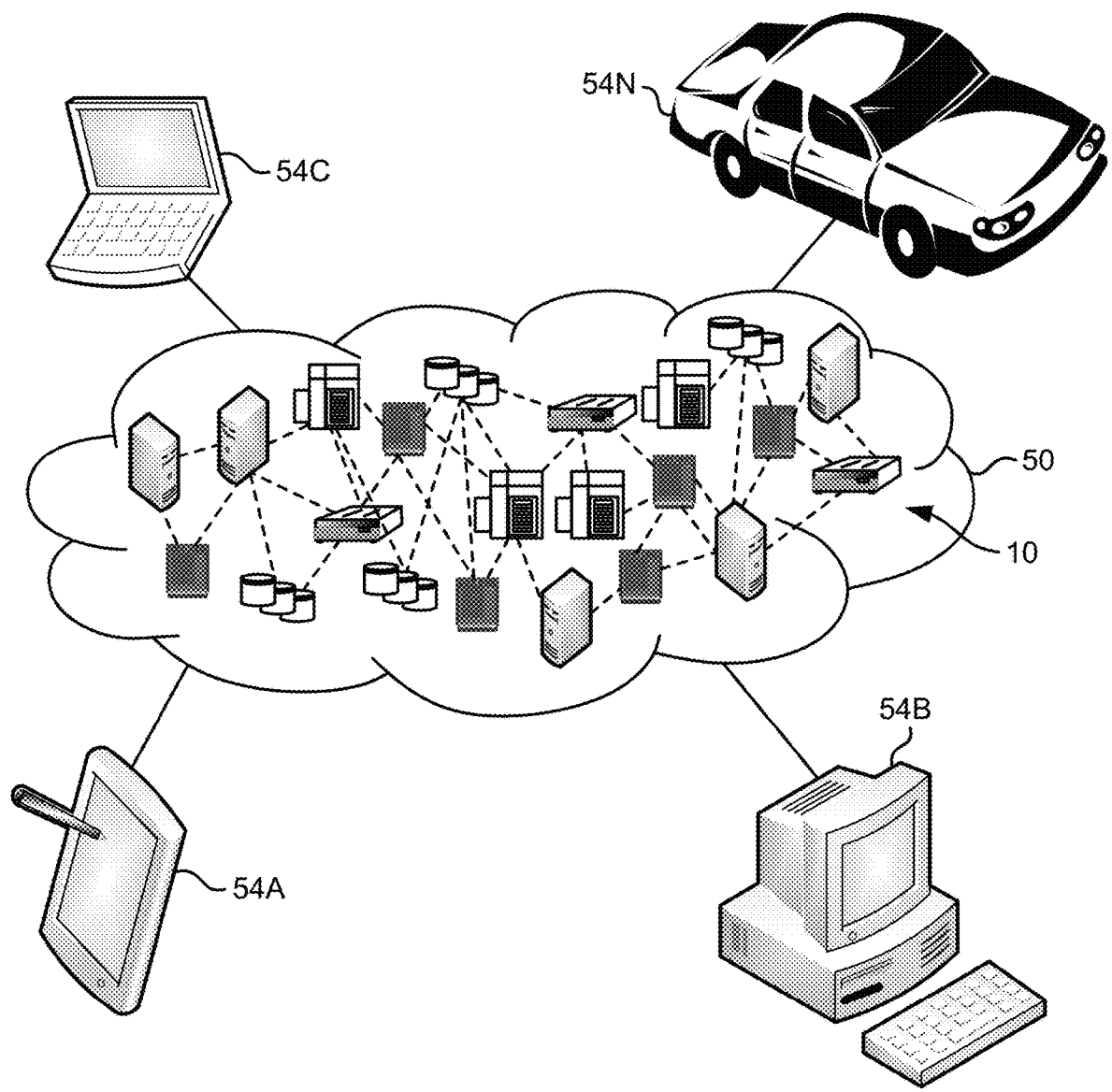
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
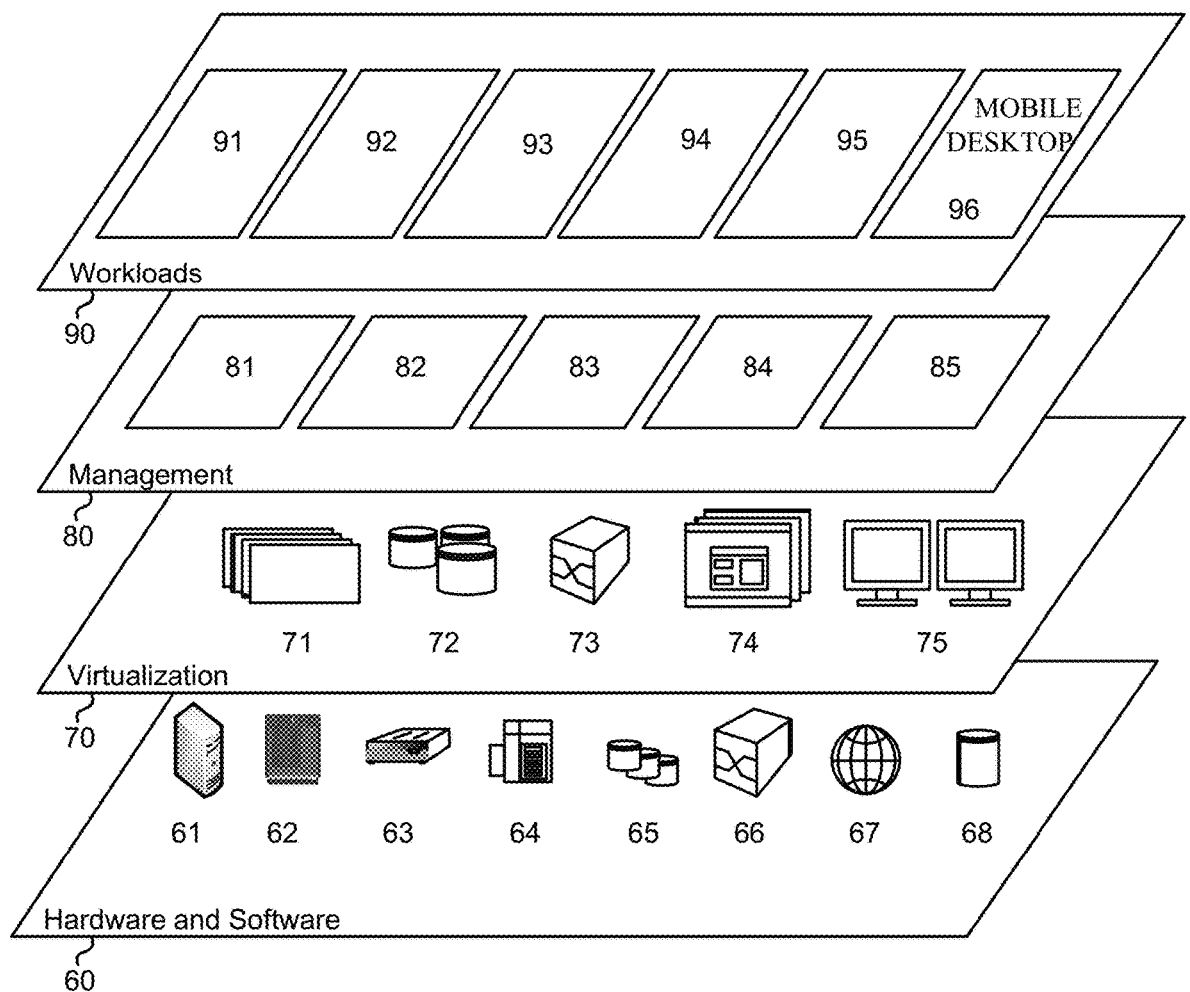
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

The management layer 80 may also provide functionality for integrating the control and management of external services into a clustered file system.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 4:
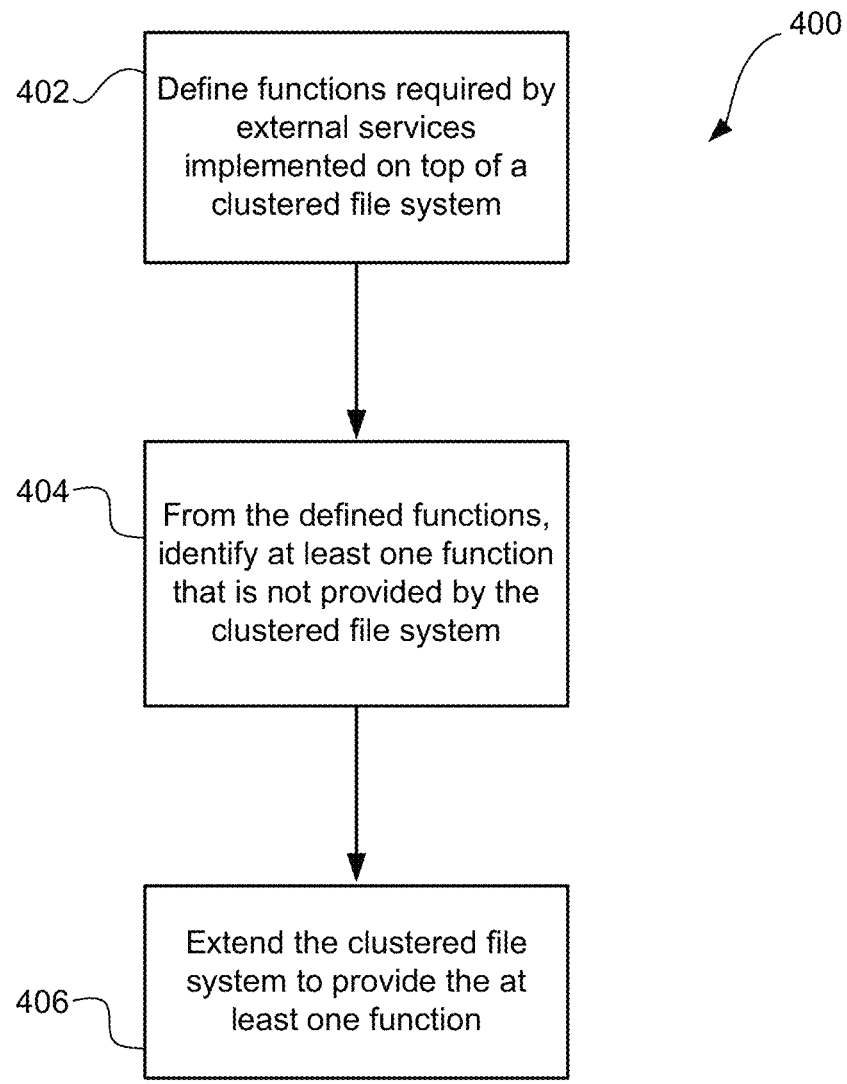
FIG. 4 illustrates a method for extending clustered file system functionality, in accordance with one embodiment.

Now referring to FIG. 4, a flowchart of a method 400, for extending clustered file system functionality, is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a data server or user device, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

At operation 402, functions are defined. The defined functions are required by external services that are implemented on top of a clustered file system. As used herein, a clustered file system may include any file system that is simultaneously mounted by multiple services and/or nodes. Examples of commercial clustered file systems include: Lustre, Oracle Cluster File System, Veritas Cluster File System, and GlusterFS (Linux). Further, the clustered file system may spread the data stored within the file system across multiple servers or storage nodes for purposes of redundancy and/or performance.

As used herein, a function may include a portion of a program, such as an operation, procedure, command, or routine that performs a particular task. Further, a function may or may not return a value. Still yet, an external service may include any executing process, not part of the clustered file system, which allows devices that are not members of the clustered file system to view and manipulate data that is in the cluster. External services may include network applications and protocols, such as Network File System (NFS), Server Message Block (SMB), OpenStack, and iSCSI, each of which may export the clustered file system. Accordingly, a function required by an external service may include any operation, procedure, command, or routine, that that enables the external service to export or externalize the clustered file system.

For example, in one embodiment, a cluster may include servers that offer services to clients, and the clients access the services by connecting to one or more IP addresses that are exported by nodes of the cluster. In such an embodiment, the clients may connect to nodes via the external services.

The clients may include Network File System (NFS) clients, Server Message Block (SMB) clients, OpenStack clients, etc., that connect to the respective service (e.g., NFS service, SMB service, OpenStack service, respectively) offered by a node at an exported IP address. For example, a SMB client may connect to the IP address for read/write access of the clustered file system using a SMB service of the node.

Further, as shown at operation 404, at least one function that is not provided by the clustered file system is identified from the defined functions.

Finally, at operation 406, the clustered file system is extended to provide the at least one function. The at least one function may include managing the initialization and failover of networking connections that the external services use to connect to entities beyond a core or base of a cluster.

In this manner, an external service that utilizes the function may be integrated with the clustered file system. Accordingly, a service, such as NFS, provided on top of a clustered file system may no longer need to be configured independently of the clustered file system. Integrating the external service with the clustered file system may make easier the administration of the external service and the clustered file system.

For example, instead of starting, stopping, and recovering two or more separate entities, the integration of the external service with the clustered file system may ensure that the startup, shutdown, and recovery of the clustered file system, and the services running on it, are coordinated.

As another example, without the integration of the clustered file system and the external services, an external service may be started before the file system has been mounted. In such an example, the data exported by the service would simply be one or more mount points, rather than the data a client intends to access within the clustered file system. Accordingly, such issues may be avoided by extending the clustered file system to provide functions required by the external services that are associated with the clustered file system.

In various embodiments, if a given application or network protocol, such as NFS or SMB, is exporting a clustered file system, it may be desirable for the application or network protocol to be running on all nodes of the cluster. In such embodiments, it may be necessary for the application or network protocol to maintain awareness of the cluster. For example, the application or network protocol may need to track which nodes of the cluster are up, which nodes of the cluster are down, which nodes are starting up, which nodes are shutting down, etc.

Consistency issues may arise when the application or network protocol maintaining awareness of the cluster operates independent of the clustered file system. For example, the file system's view of the cluster, such as a state of the cluster and which nodes are operational, may not correspond to what the application or network protocol has determined to be the view of the cluster. If an application or network protocol has determined that a given node is up, but the clustered file system has determined that the node is not up, then such an inconsistency may result in various communication errors, as well as data correction.

Moreover, when the application or network protocol maintaining awareness of the cluster operates independent of the clustered file system, additional issues may arise during transitional events, such as when a node goes down or during recovery operations. In some situations, if an external service is executing failover operations to move the service from the node that has gone down to another node that is up, and the clustered file system is expected to independently execute operations in response to the loss of the node, then issues may arise. For example, if the external service responds to a downed node by independently implementing a recovery mechanism that executes the failover operations, the clustered file system may not recognize that the node has gone down. Issues may subsequently arise due to the clustered file system not tracking the loss of the downed node.

Thus, by extending the clustered file system to provide the at least one function, the clustered file system and services running on the file system may be coordinated. In addition, by extending the clustered file system, which is aware of transition phases in the system as they occur, the file system may effectively control the external services in a manner that avoids consistency and coordination issues. For example, the clustered file system is aware of when steps such as initialization, start up, etc., are complete, and the file system is ready to provide access to services to applications and protocols that exist on top of the file system.

In various embodiments, the clustered file system may be extended to provide the at least one function by providing one or more interfaces. As described below, the external services may register with the one or more interfaces to be notified or integrated into various transition phases. For example, NFS may register at an interface for notification of a particular startup phase, and at the same or a different interface for notification of a particular shutdown phase. Subsequently, upon reaching a particular transition phase during startup, the clustered file system may issue a callback to NFS, and NFS may startup in response. Accordingly, any issues that would arise when NFS starts before the clustered file system may be prevented. For example, if NFS is started on a node before the clustered file system is correctly mounted, the wrong data may be exported. Similarly, upon reaching a particular transition phase during shutdown, the clustered file system may issue another callback to NFS, and NFS may shutdown in response.

In addition, by extending the clustered file system to provide the at least one function, the clustered file system and the services running on the file system may no longer need to be treated as separate entities for purposes of administration, availability, and maintenance.

Figure 5:
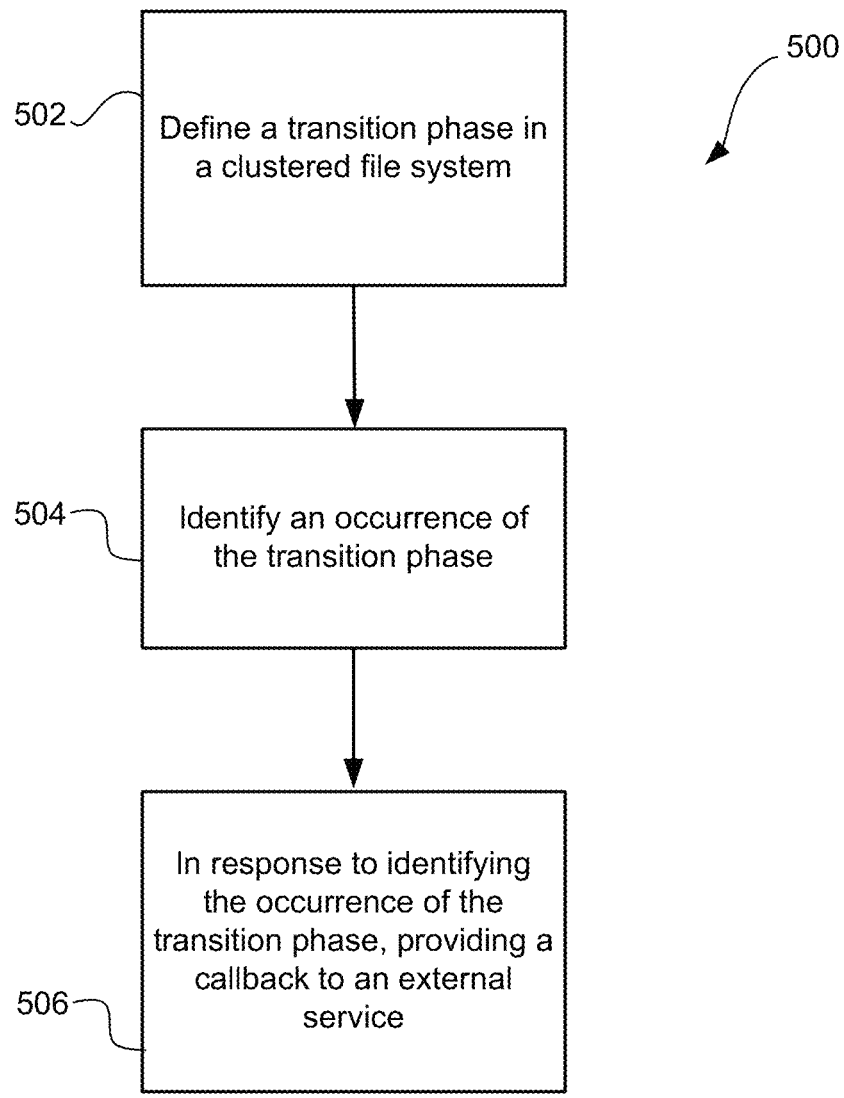
FIG. 5 illustrates a method for providing a callback to an external service, in accordance with another embodiment.

Now referring to FIG. 5, a flowchart of a method 500, for providing a callback to an external service, is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a data server or user device, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown, at operation 502, a transition phase is defined in a clustered file system. A transition phase may include any point in time or point in function at which the clustered file system responds to an event.

In one embodiment, the transition phase may include initialization completing to a specific point. For example, the transition phase may include completing an initialization process up until the clustered file system is mounted.

In another embodiment, the transition phase may include a specific point of a startup process. For example, the transition phase may include a point of startup that occurs just after the clustered file system is mounted.

In yet another embodiment, the transition phase may include shutdown completing to a specific point. For example, the transition phase may include a point during the shutdown process that occurs just before the clustered file system is un-mounted.

In one embodiment, the transition phase may include recovery completing to a specific point. For example, the transition phase may include a point during a recovery process that occurs just before resources, such as locks, are released by the failed nodes that were holding them.

In yet another embodiment, the transition phase may include loss of quorum. Quorum loss may occur, for example, when a cluster has split into two or more groups of servers and nodes that are unable to communicate with each other, and a node determines that a threshold number of nodes of the cluster are no longer up and in communication with each other.

While various exemplary clustered file system transition phases have been identified above, it is understood that the present disclosure applies equally well to other transition phases that may occur within a clustered file system.

After one or more transition phases are defined, a mechanism of the clustered file system may be constructed to inform the external services that these transition phases are occurring, and to provide a method to execute external service actions at this point. These mechanisms and methods may include interfaces and callbacks, as described in more detail below.

Accordingly, at operation 504, an occurrence of the transition phase is identified. The occurrence of the transition phase may be identified by monitoring the clustered file system, hooks in the clustered file system, filtering operations of the clustered file system, etc.

Finally, a callback to an external service is provided, at operation 506, in response to identifying the occurrence of the transition phase. The callback to the external service may be provided by extending the clustered file system, as described above. Thus, each of the transition phases may include an event that results in providing a callback to an external service. As used herein, a callback may include any communication from the clustered file system that is provided to the external service to convey a state of the clustered file system. Further, a callback may provide a mechanism to invoke service-specific processing.

For example, a startup callback may notify an external service that the clustered file system is up, and the external service is permitted to invoke its own startup routine. In this manner, the clustered file system and the external service may be started in unison. Similarly, a shutdown callback may notify an external service that the clustered file system is shutting down, and the external service is to invoke its own shutdown routine. In this manner, the external service may be notified that it should gracefully cease exporting services to external clients, and the clustered file system and the external service may be shutdown in unison.

In various embodiments, a cluster may include servers that offer services to clients, and the clients access the services by connecting to one or more IP addresses that are exported by nodes of the cluster. The clients may not connect to the servers themselves, but instead the clients connect to nodes via external services. Further, nodes of the cluster may be responsible for exporting the IP addresses for external access by various clients. Thus, in such embodiments, the clustered file system may now be responsible for bringing up and down the exported IP addresses that provide access to the external clients.

Still yet, when a node fails or otherwise exits a cluster, the clustered file system may initiate recovery, and, as part of the recovery, invoke a recovery callback to the external services at one of the predetermined transition phases. In this manner, the clustered file system and the external services may recover in unison from adverse events.

In one embodiment, an external service may register to receive a callback. For example, the external service may register at an interface of the clustered file system. Moreover, the external service may register at the interface of the clustered file system for a callback associated with a particular transition phase.

In some embodiments, the interfaces may flexibly allow a registering external service to specify various parameters or attributes that control when the external service is provided a callback.

In one embodiment, for example, a registering external service may specify to an interface of a clustered file system a service specific function that is to be executed at a given transition phase. Further, the external service may specify if the service specific function is to be executed only on a particular node, or, instead, if the service specific function is to be executed on multiple nodes of the cluster.

In another embodiment, a registering external service may specify to an interface of a clustered file system an order function. The order function may restrict when a callback is provided to the external service. In other words, the registering external service may specify that a given callback, such as a recovery callback, is only to be provided to the external service after execution of one or more other recovery functions. The other recovery functions may include callbacks to other registered external services. In other words, an external service may elect the order in which it is called with respect to other external services. In this manner, the external services may provide to the clustered file system a particular order of startup, shutdown, recovery, etc. that avoids conflicts and satisfies various dependencies.

As a particular example, if NFS should be called after SMB during a startup transition phase, then, when registering with the clustered file system, NFS may specify an order function that requests a startup callback only after SMB is active. For a protocol that is used to drive a network, the protocol may register for a callback prior to the network being initialized. Conversely, a protocol that relies on the presence of a network may register for a callback that is sent only after the network is initialized.

In one embodiment, a registering external service may specify a synchronous or asynchronous attribute. Such an attribute may allow or disallow the clustered file system from executing other functions or procedures based on a status of the callback provided to the registered external service. For example, if the registering external service specifies a synchronous attribute with its registration for a callback, then, when the callback is provided during cluster operation, the clustered file system will be prevented from executing other functions or procedures prior to the external service completing activity associated with the callback. However, if the registering service specifies an asynchronous attribute with its registration for the callback, then, when the callback is provided during cluster operation, the clustered file system is allowed to continue executing other functions or procedures prior to the external service completing activity associated with the callback.

In another embodiment, a registering external service may specify one or more error handling attributes to an interface of a clustered file system. These error handling attributes may provide the clustered file system instructions for responding to errors associated with the external service.

In some embodiments, after an external service has registered to receive a callback, the clustered file system may construct a service registration within the cluster. The registration may be utilized by the clustered file system for determining when to provide a callback to the external service. For example, the registration may be utilized by the clustered file system for determining when a transition phase has occurred, and/or which external services should be provided a callback in response to the transition phase occurring.

Because an external service has previously registered to receive any callback that it may receive from the clustered file system, the external service may know precisely a state of the clustered file system when it receives a callback from the clustered file system. Accordingly, integrating into the clustered file system the administration of the external services may prevent any state mismatches between the clustered file system and the external services.

For example, if an external service receives a startup callback, then the external service is aware that the file system has already been mounted, because the startup callback is only made after file system mounting. Similarly, if an external service receives a shutdown callback, then the external service is aware that shutdown of the file system has progressed to a previously established point. In this manner, the callbacks inherently ensure that the external services and the clustered file system are coordinated at specific points in time.

The nodes of a cluster may be grouped into one or more clustered file system sub-clusters. Further, the cluster may be configured such that only a given sub-cluster is eligible to run one or more external services. In one embodiment, the cluster may be configured such that only the nodes of a given sub-cluster are eligible to run any of the external services. The nodes of such a sub-cluster may include the nodes of the cluster that have external network access.

In a given configuration, a cluster may include only one node that is capable of supporting a particular external service. In another configuration, all of a plurality of nodes of a cluster may be capable of supporting the particular external service. In yet another configuration, a plurality of nodes of a cluster, or all the nodes of a cluster may be capable of supporting all of the external services executing on the cluster.

In some embodiments, a cluster may include one or more nodes that provide access to a clustered file system, and the cluster may implement service address pools. The clustered file system may allow management and monitoring of the addresses in the pools, in addition to recovery methods. More than one node of a cluster may be configured to support the network addresses. In the event that a cluster node currently configured with an address alias fails, then that address may be moved to a healthy node. By failing-over the addresses between nodes of a sub-cluster, the clustered file system may ensure that the exported addresses are always accessible to external clients.

Figure 6:
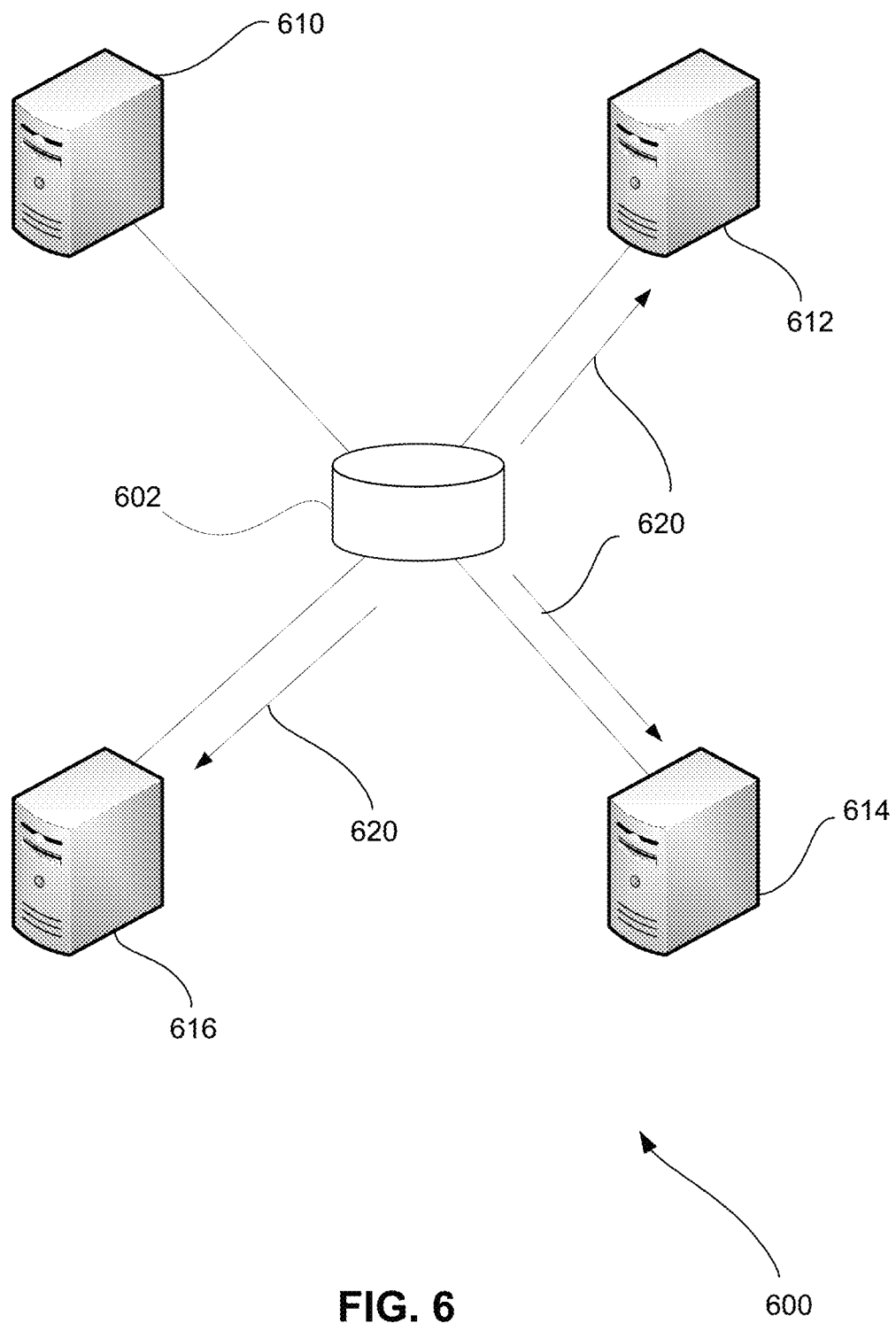
FIG. 6 illustrates a cluster recovering from a downed node, according to one embodiment.

FIG. 6 depicts a cluster 600 recovering from a downed node, in accordance with one embodiment. As an option, the present cluster 600 may be implemented in conjunction with features from any other embodiment listed herein, such as those described with reference to the other FIGS. Of course, however, such cluster 600 and others presented herein may be used in various applications and/or in permutations which may or may not be specifically described in the illustrative embodiments listed herein. Further, the cluster 600 presented herein may be used in any desired environment.

As illustrated in FIG. 6, the cluster 600 is shown to include a clustered file system 602, and nodes 610-616. Moreover, the cluster 600 is shown recovering from a failure of the node 610. As a step of the recovery, the clustered file system 602 may evaluate external service registrations to determine whether there is a registration for a recovery transition phase. If there are registrations for a recovery transition phase, then the registrations may be called using callbacks, as discussed above. Any callbacks may be performed in an order that is determined using order functions that were specified by the external services during registration.

As an example, if NFS had previously registered, for the recovery transition phase, a callback which initiates NFS grace for nodes lost to failure, and each of the nodes 612-616 are providing NFS, then grace may be initiated. Grace may include a time period that NFS provides to allow NFS clients to re-establish locks, etc. that are lost in the event of a node failure. Grace may also include a time period that NFS provides to allow NFS clients to re-establish locks, etc. that are lost if the clients are disconnected from an exported IP address because the IP address is being moved to another node. Grace may provide the clients an interval to re-establish their state when the exported IP address is moved. Still yet, if NFS had previously registered, for the recovery transition phase, that such recovery callbacks are synchronous and NFS must receive such recovery callbacks prior to recovering network addresses from the failed node, then the clustered file system 602 must wait for NFS to establish grace before proceeding with any subsequent recovery functions.

Thus, if the clustered file system 602 checks the external service registration for the recovery transition phase, and determines that NFS has registered a function that initiates NFS grace, then the clustered file system 602 calls an NFS recovery function for NFS grace via callbacks 620 to the nodes 612, 614, and 616. Further, because the recovery callbacks for NFS are synchronous, the clustered file system 602 will then wait for a completion of the function that initiates NFS grace. Once the NFS recovery function has completed, the clustered file system 602 may free locks and other states of the failed node 610, and the failed node 610 may then be recovered. After the failed node 610 has been recovered, the clustered file system may provide another callback to nodes 612-616 that indicates the completion of recovery. This may facilitate the return of exported addresses to the node 610.

Accordingly, the description provided above provides a manner of complete integration between a clustered file system and external services exporting the clustered file system. From an external perspective, the clustered file system may trigger the start of services and configuration of service network addresses using callbacks. Such network addresses may not exist prior to the start of the clustered file system. Further, when the clustered file system is shutdown, the clustered file system may trigger the shutdown of the external services, and begin the process of removing the network addresses.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving, via an interface of a clustered file system, registration information from an external service;
identifying a plurality of parameters associated with the registration information, the plurality of parameters including an identification of a transition phase that includes an event associated with the clustered file system;
constructing a service registration within the clustered file system, based on the plurality of parameters;
identifying an occurrence of the transition phase within the clustered file system, utilizing the service registration; and
performing a callback to a plurality of external services in response to the occurrence of the transition phase, according to the service registration, the callback including a communication from the clustered file system to the plurality of external services that indicates a state of the clustered file system.

2. The computer-implemented method of claim 1, wherein the plurality of parameters further include a service specific function to be executed.

3. The computer-implemented method of claim 1, wherein the plurality of parameters further include:
- a specification of a function to be executed within the clustered file system at the transition phase,
- an indication identifying one or more nodes of the clustered file system on which the function is to be executed,
- an indication of an order in which the callback is provided to the external service with respect to other external services, and
- an attribute that disallows the clustered file system from executing a function based on a status of the callback.

4. The computer-implemented method of claim 1, wherein the plurality of parameters further include a synchronous or asynchronous attribute, and an order in which a service specific function and a plurality of additional functions are to be executed.

5. The computer-implemented method of claim 1, wherein the plurality of parameters further include one or more error handling attributes.

6. The computer-implemented method of claim 1, wherein the external service includes a process that is not part of the clustered file system that allows devices that are not members of the clustered file system to view and manipulate data within the clustered file system.

7. The computer-implemented method of claim 1, wherein the external service includes an OpenStack service or a Server Message Block (SMB) service.

8. The computer-implemented method of claim 1, wherein a plurality of callbacks are performed in an order determined using order functions specified by the external service and additional external services during a registration.

9. The computer-implemented method of claim 1, wherein the transition phase includes a failure of a node within the clustered file system.

10. The computer-implemented method of claim 1, wherein the event includes a recovery of a failed node within the clustered file system.

11. A computer program product for extending clustered file system functionality, the computer program product comprising a computer readable storage medium having program instructions embodied therewith, wherein the computer readable storage medium is not a transitory signal per se, the program instructions executable by a processor to cause the processor to perform a method comprising:
- receiving, utilizing the processor via an interface of a clustered file system, registration information from an external service;
- identifying, utilizing the processor, a plurality of parameters associated with the registration information, the plurality of parameters including an identification of a transition phase that includes an event associated with the clustered file system;
- constructing, utilizing the processor, a service registration within the clustered file system, based on the plurality of parameters;
- identifying, utilizing the processor, an occurrence of the transition phase within the clustered file system, utilizing the service registration; and
- performing, utilizing the processor, a callback to a plurality of external services in response to the occurrence of the transition phase, according to the service registration, the callback including a communication from the clustered file system to the plurality of external services that indicates a state of the clustered file system.

12. The computer program product of claim 11, wherein the plurality of parameters further include a service specific function to be executed.

13. The computer program product of claim 11, wherein the plurality of parameters further include an order in which a service specific function and a plurality of additional functions are to be executed.

14. The computer program product of claim 11, wherein the plurality of parameters further include a synchronous or asynchronous attribute.

15. The computer-implemented method of claim 1, further comprising:
- evaluating a plurality of service registrations to determine whether there is a registration for the transition phase; and
- identifying the constructed service registration, in response to the evaluating.

16. The computer-implemented method of claim 1, wherein the service registration indicates the plurality of external services to which the callback is to be performed in response to the phase occurring.

17. A system, comprising:
- a processor; and
- logic integrated with the processor, executable by the processor, or integrated with and executable by the processor, the logic being configured to:
- receive, via an interface of a clustered file system, registration information from an external service;
- identify a plurality of parameters associated with the registration information, the plurality of parameters including an identification of a transition phase that includes an event associated with the clustered file system;
- construct a service registration within the clustered file system, based on the plurality of parameters;
- identify an occurrence of the transition phase within the clustered file system, utilizing the service registration; and
- perform a callback to a plurality of external services in response to the occurrence of the transition phase, according to the service registration, the callback including a communication from the clustered file system to the plurality of external services that indicates a state of the clustered file system.

* * * * *